(No Model.)
J. M. JOHNSON.
EXPANDING SCREW TAP.
No. 316,040. Patented Apr. 21, 1885.
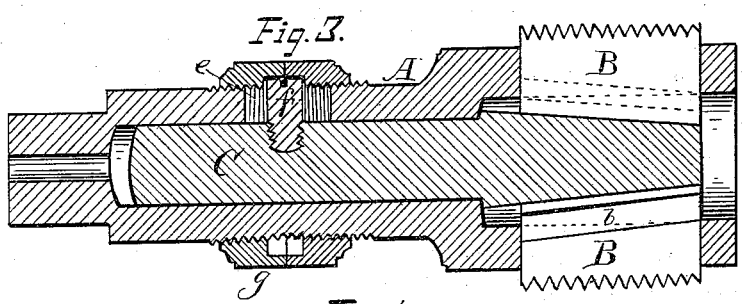
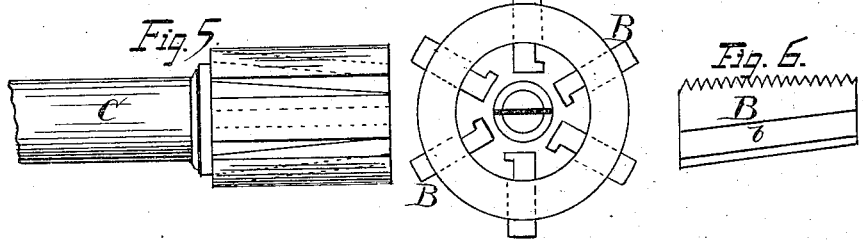
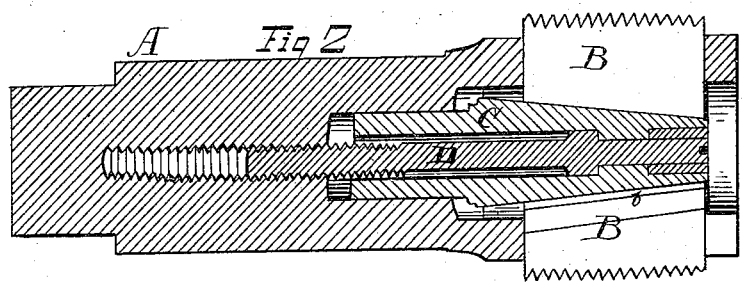
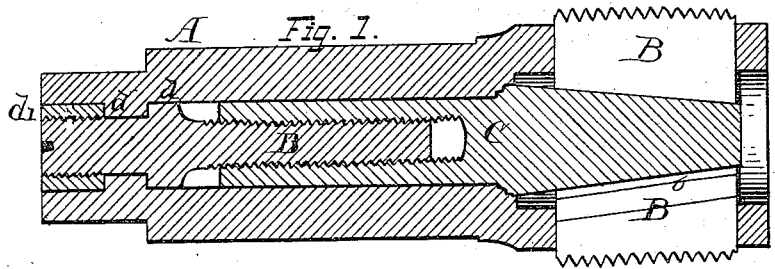
Witness
E. W. Laird
F. R. Tibbitts
Inventor
James M. Johnson
By Geo. W. Tibbitts Atty.

UNITED STATES PATENT OFFICE.

JAMES M. JOHNSON, OF CLEVELAND, OHIO.

EXPANDING SCREW-TAP.

SPECIFICATION forming part of Letters Patent No. 316,040, dated April 21, 1885.

Application filed December 24, 1883. (No model.)

*To all whom it may concern:*

Be it known that I, JAMES M. JOHNSON, of Cleveland, in the county of Cuyahoga and State of Ohio, have invented certain new and useful Improvements in Expanding Screw-Taps, of which the following is a specification.

This invention relates to screw-tapping tools; and it consists of a hollow mandrel having slots for holding the cutting-dies, and provided with a tapering core having sockets or slots, in which the cutting-dies are seated, the core having a screw-threaded bore, in which a screw works for setting the said core for adjusting the dies outwardly, and for collapsing the dies for withdrawing the tool, when desired.

In the accompanying drawings, Figures 1, 2, and 3 are longitudinal sections of modified forms of the improved tap. Fig. 4 is an end view. Fig. 5 is a detached view of the taper slotted core. Fig. 6 is a detached view of one of the cutting-dies.

A is a hollow mandrel provided at the cutting end with slots for the cutting-dies B. C is a sliding core fitted within the mandrel. Its forward end is enlarged, and is provided with slots whose bottom surfaces are made at an inclination from the center line. The rear portion of the core is bored out and screw-threaded, and in the end of the mandrel is placed a screw, D, which works in said bore. The screw D has a collar, d, resting against a shoulder, a, in the mandrel A, and a sleeve, d', is fixed on the end of the screw D, for securing it in place. This screw D is for adjusting the core inward or outward, as may be required, it being turned with an ordinary screw-driver.

Instead of making the core with a rear projecting rod or shank, it may be made with a short shank to enter a shorter bore in the mandrel and be bored out, and have a screw, like the screw D, fitted within it, the interior of the mandrel beyond the bore for the shank of the core being tapped for said screw to work in. The cutting-dies B have their inner edges inclined to fit the aforesaid slots in the end of the core. The dies also have slots $b$ cut near their inclined edges, in which slots suitable feathers fit, which hold the dies in place and allow them to slide in expanding and contracting.

In Fig. 3 the shank of the core is not bored or screw-threaded; but in the mandrel is made a slot, $e$, through which a short stud, $f$, set in the core, plays for moving it inward or outward. The outside of the mandrel is screw-threaded, and jam-nuts $g$ are fitted to screw thereon, their contact-faces counterbored, so as to fit over the end of the stud. These nuts serve to hold the core in the required position.

One of the objects of these improvements is, that when the dies become a little worn they may easily be expanded, so as to continue cutting to uniform size, and another advantage is, that the dies may be contracted for withdrawal from the work without revolving.

As represented in Figs. 1 and 2, the tool has all the mechanism for operating the dies contained inside, so that the shank of the tool may be any convenient length, and is thus adapted to hand use, as in bridge-work and the like.

By substituting plain cutting-dies for the threading-dies, the tool is adapted for use as a reaming-tool, useful in gas-pipe work.

Having described my invention, I claim—

The combination of the mandrel A, the sliding dies B, having inclined edges, the sliding core C, having a pin, $f$, setting through a slot, $e$, in the mandrel, and the jam-nuts $g$, all arranged to operate in the manner and for the purposes specified.

JAMES M. JOHNSON.

Witnesses:
GEO. W. TIBBITTS,
M. G. NORTON.